United States Patent [19]

Meyer

[11] Patent Number: 4,769,651
[45] Date of Patent: Sep. 6, 1988

[54] FIBER OPTIC CATHODE RAY TUBE CAMERA

[75] Inventor: Armin Meyer, Belfaux, Switzerland

[73] Assignee: Ciba-Geigy AG, Basel, Switzerland

[21] Appl. No.: 842,237

[22] Filed: Mar. 21, 1986

[30] Foreign Application Priority Data

Mar. 27, 1985 [CH] Switzerland .................. 1340/85

[51] Int. Cl.⁴ .............................................. G01D 9/42
[52] U.S. Cl. .............................. 346/110 R; 350/166; 350/311
[58] Field of Search ............. 346/110 R, 108, 107 R, 346/76 L, 110 VP; 350/311, 317, 166

[56] References Cited

U.S. PATENT DOCUMENTS

| | | | |
|---|---|---|---|
| 3,267,209 | 2/1963 | Nagamori | 358/237 |
| 4,141,642 | 2/1979 | Nagai | 358/250 |
| 4,309,720 | 1/1982 | Denham | 358/75 |
| 4,459,512 | 7/1984 | Ohta | 346/110 R |

FOREIGN PATENT DOCUMENTS

| | | |
|---|---|---|
| 1487188 | 1/1969 | Fed. Rep. of Germany . |
| 55-66843 | 5/1980 | Japan . |
| 58-120240 | 7/1983 | Japan . |

*Primary Examiner*—E. A. Goldberg
*Assistant Examiner*—Mark Reinhart
*Attorney, Agent, or Firm*—Burns, Doane, Swecker & Mathis

[57] ABSTRACT

A cathode ray tube is coated on the inside of its fiber optic front plate with a broad band phosphor. In front of the front plate a second fiber optic plate is located. Three parallel strips of dichroic color filters are vapor deposited on the inside of the second plate. Optical contact between the two optical fiber plates is established by a layer of immersion oil. A photosensitive material is moved at a slight distance along the second fiber optic plate transversely to the color filter strips so that it will be exposed line by line. The use of filters in place of different phosphors to produce the individual colors produces significantly improved color separation and thus better reproduction of the image, while retaining the inherent advantages of fiber optic plates.

10 Claims, 1 Drawing Sheet

FIBER OPTIC CATHODE RAY TUBE CAMERA

BACKGROUND OF THE INVENTION

The present invention relates to a cathode ray tube camera of the type having an imaging plate comprised of optical fibers that are coated on one side with a phosphor layer.

While it is possible to photograph a color television screen or a monitor with a simple camera, the result that is obtained satisfies only very modest requirements. Reasons for this limitation include the facts that the number of lines per image height provides a low image sharpness, the shadow mask which separates the individual image elements for blue, green and red from each other is also reproduced, and the curved screen leads to geometrical distortions. For this reason, special cameras have been designed to photograph such images with a high resolving power. These cameras are equipped with relatively small picture tubes (the diagonal of the image is approximately 12-23 cm=5-9 inches). These picture tubes produce the image on a flat front plate, whereby geometrical distortions can be avoided. The image is transferred by optical means to the light sensitive material. The picture tube contains on the inner side of the front plate a phosphor layer which emits blue, green and red light, thereby producing an non-colored image. Blue, green and red filters can be successively inserted into the beam path. For example, the electron beam of the picture tube is first modulated with the blue signal and the image exposed through the blue filter, then with the green image combined with the green filter, followed in a similar manner by the red exposure. This method avoids the disadvantages of the shadow mask. The sharpness of the image may be significantly improved relative to color television, since available picture tubes are capable of a resolution of up to 4,000 lines per image height.

Very good images can be produced with a cathode ray tube, depending on cost, but there is a severe disadvantage: the modest luminous efficiency of the optical system, combined with the sequential exposure of the three basic colors, leads to long exposure times. With 1,000 lines per image height for a material of a sensitivity of 80-100 ISO, for example, approximately 30-60 seconds are required for the exposure. If picture tubes with a higher resolution, for example, 4,000 lines, are used, the exposure time is even much longer, since the image elements then have areas for example that are 16 times smaller, resulting in a lower light intensity.

In order to shorten the exposure time, phosphors with an increased red emission may be used, since the exposure time for red is the longest. For example, phosphors doped with europium may be employed. Also, the anode voltage of the picture tube can be increased. However, beginning at about 20 kV, x-rays are produced, which are not acceptable without further measures.

A further method to shorten the exposure time is the use of color photographic material with a higher sensitivity. Materials of this type are available in the form of camera films only, their resolution is lower and their graininess higher than that of materials with a lower sensitivity. These disadvantages limit their application. For this reason, materials with lower sensitivities, but capable of particularly rapid and simple photochemical processing are preferred.

For this application, CRT cameras were developed that make it possible to expose photomaterial in contact with the front plate of the picture tube. The optical imaging means are eliminated and the apparatus therefore is much smaller. In order to obtain good image sharpness an essential change is, however, required: the front plate of the picture tube consists of a plurality of very thin optical fibers, which conduct the light from the internal phosphor layer, which is located in a high vacuum, over a straight path onto the external photographic layer. The optical fibers are fused together into a compact, air-tight plate. The fibers therefore have a hexagonal cross section, a thickness of about 7 microns, and they consist of a core and a jacket. The individual fibers thus are at least 7 times thinner than the size of the relevant image structures in an image of 20×25 cm. The core and the jacket are made of glasses with different refractory indices. The core has a higher refractory index than the relatively thin jacket. The light is conducted by total reflection from the jacket. In order to absorb scatter light and light with a large angle of incidence (relative to the perpendicular to the surface), typically 3% of the fibers are made of black glass. The cross section of the black fibers and the jacket cross sections (approx. 9.5%) result in a light loss of about 12.5%.

CRT cameras with optical fiber front plates are made for the exposure of monochromatic photographic materials. In operation, successive lines are written at the same location on the long and narrow front plate. The photomaterial is moved in a suitable manner transversely to this line, so that the lines appear adjacent to each other to form a complete image after photographic processing. Due to a much higher luminous efficiency compared to conventional CRT cameras, images of for example 20×25 cm may be recorded typically in about 2-4 seconds, even on low sensitivity photomaterials.

However, faster optical CRT cameras capable of color work are not as yet available. It has already been proposed to coat the inside of the front plate with three strips of different phosphors adjacent to each other, one each for the emission of blue, green and red light. See, for example, U.S. Pat. No. 4,309,720. The electron beam writes successive lines, for example first blue, then green and finally red. This merely requires a vertical deflection of the beam in a manner such that it will jump for each color line from one phosphor strip to the other. It is further possible to use a CRT with three electron beam sources, one for each basic color, as is customary in "triple gun" color television tubes.

In this method, independently of whether a single beam or a three-beam tube is used, the signal must be synchronized with the motion of the photomaterial, that is, associated blue, green and red signals must be written in succession. Thus, for example, the green signal must be written later than the blue signal, and the red signal later than the green signal. This is readily possible at the present time by electronic means.

The use of three phosphor strips, one each for the colors blue, green and red, is, however, not without limitation. Compared with a tube using one phosphor only, manufacturing is more difficult and furthermore, many phosphors have emission spectra which are not sufficiently monochromatic. This unfavorably affects color separation and thus color reproduction. Data concerning the selection of phosphors is given in U.S. Pat. No. 4,459,512.

It is the object of the present invention to eliminate the aforementioned disadvantages of cathode ray tube cameras having several phosphor strips. It is a particular object to provide a color capable cathode ray tube camera having high light efficiency, thus making possible better color separation and better color reproduction.

SUMMARY OF THE INVENTION

In accordance with the present invention, this object is achieved by providing a second optical fiber plate adjacent the first plate. Parallel color filter strips of different spectral permeabilities are sandwiched between two plates and extend in the direction of the luminous phosphor lines.

BRIEF DESCRIPTION OF THE DRAWINGS

In the following description, an embodiment of a cathode ray tube camera according to invention is explained in more detail with reference to the drawings.

DETAILED DESCRIPTION

Figures 1, 2:
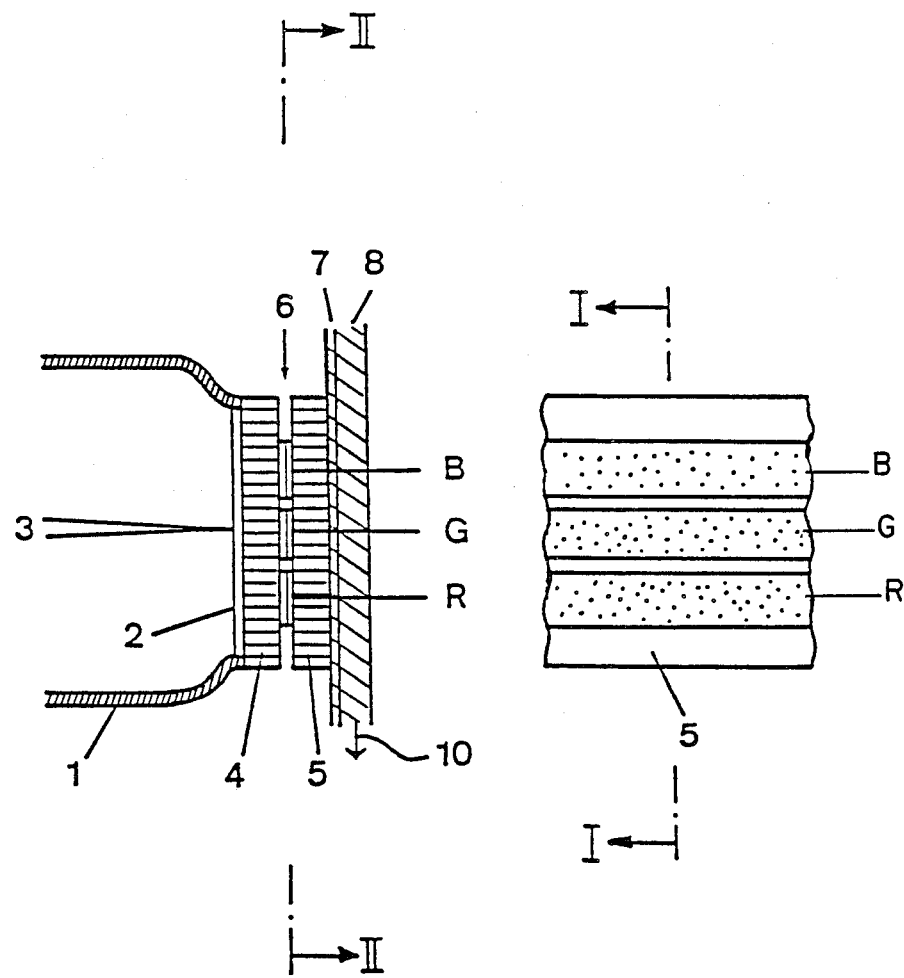
FIG. 1 shows a schematic sectional side view of the parts of the camera relevant to the invention.
FIG. 2 is a front view taken along the line II—II of FIG. 1.

A camera incorporating the present invention comprises a cathode ray tube 1 with a optical fiber front plate 4, the inside of which is coated with a phosphor layer 2. A second optical fiber plate 5 is arranged in front of the front plate 4 in optical contact with the front plate by means of an immersion oil layer 6. Placed between the two optical fiber plates 4 and 5 are three narrow color filter strips B, G and R. They extend parallel to the luminous lines (perpendicular to the plane of the drawing in FIG. 1) produced by the electron beam 3. These color filter strips are preferably in the form of dichroic filters and are vapor deposited onto the second optical fiber plate 5.

A light sensitive material consisting of a support 8 and a light sensitive coating 7 is located on the outer side of the second optical fiber plate 5, in contact with it or slightly spaced from it. This material, as mentioned above, is moved by means that are known in the art and are indicated in a symbolic manner by the arrow 10, in a direction transverse to the luminous lines on or by the second optical fiber plate 5. In the process this material is exposed line by line. The cathode ray tube 1 produces three luminous lines respectively located at the position of the filter strips. The writing of these lines is synchronized with the movement of the light sensitive material so as to produce a composite color image.

In order to avoid the loss of light and lack of sharpness of the image, the filter strips must be very thin (approx. 10 microns) and highly light resistant. Dichroic filters generally satisfy these conditions better than absorption filters, but in certain applications absorption filters can be used.

As mentioned above, a slight distance may be provided between the photographic material and the outer surface of the second fiber optic plate 5. It may amount for example to 10–100 microns, preferably about 30–60 microns. In this manner scratches and the deposition of dirt on the outer surface of the second fiber optic plate can be avoided.

Conventional layer supports, such as paper or film may be used as the photographic support material, such as those described for example in Research Disclosure, No. 17,643, Section XVII A to G, December 1978.

The photosensitive coating 7 is adjusted to the spectral permeability ranges of the color filter strips. The same is true naturally for the phosphor layer 2 in the cathode ray tube 1, which must emit a spectrum broad enough to cover all of the spectral ranges determined by the color filter strips. Suitable phosphors are described in the literature.

Conventionally, the color filter strips are permeable for the colors red, blue and green. However, other color combinations may be chosen, for example ultraviolet-blue-green or for example two visible ranges and an IR range, or the like. Obviously, more than three spectral ranges may be provided, and optionally also white, if uncolored recording is desired. Similarly, so-called false color films may be employed. It is further possible to write not entire lines onto the phosphor. For example, a short piece of a line of each color can be written in rapid succession. Methods of this type are described for example in U.S. Pat. No. 4,309,720.

The principal difference between the color capable camera of the present invention and comparable conventional cameras therefore consists of the fact that it does not comprise a separate phosphor for each of the spectral ranges desired. Rather, only a single phosphor with a suitable broad band is present and the colors are produced by selective filtering, while optical fiber plates and not imaging by means of an objective lens are used. The camera according to the invention provides a significantly higher luminous efficiency compared to cameras working with lens imaging (approx. a factor of 50) and a substantially improved color separation and thus a higher image quality relative to color capable optical fiber plate types.

What is claimed is:

1. A fiber optic cathode ray tube camera, comprising:
   a cathode ray tube having a first fiber optic plate,
   a phosphor layer which emits a broad optical spectrum located on a vacuum side of said plate so as to produce at lease one luminous line;
   a second fiber optic plate in front of another side of said first plate, and
   at least two parallel color filter strips of different spectral permeabilities and extending in the direction of the luminous line located between said two fiber optic plates, whereby the filter strips include very thin dichroic filters, vapor deposited on an inner side of the second fiber optic plate.

2. A camera according to claim 1, further including:
   means for moving a photographic material that is sensitive in the permeability range of said color filter strips in a direction transverse to the luminous line along said second fiber optic plate at a distance in the range of 0–100 microns, measured between an outer side of said second fiber optic plate and the photographic material.

3. A camera according to claim 2, wherein said distance is approximately 10–100 microns.

4. A camera according to claim 3, wherein said distance is in the range of 30–60 microns.

5. A camera according to claim 1, wherein said second plate is in optical contact with said first plate by means of a very thin layer of immersion oil therebetween, said oil filling any unevenness of surfaces of said plates which are in contact.

6. A camera according to claim 2, wherein said cathode ray tube produces a plurality of luminous lines, each of which acts on one of the color filter strips at predetermined intervals such that a color image is produced on the photographic material.

7. A camera according to claim 1, wherein the color filter strips are provided for the colors blue, green and red.

8. A camera according to claim 1, wherein the color filter strips are provided for two ranges in the visible spectrum and one range in the near infrared spectrum.

9. A camera according to claim 1, wherein the color filter strips are provided for near ultraviolet, blue and green.

10. A camera according to claim 1, wherein the color filter strips are provided for more than three spectral ranges.

* * * * *